Aug. 9, 1960
C. J. CAPUANO
2,948,423
BOAT TRAILER
Filed March 16, 1959
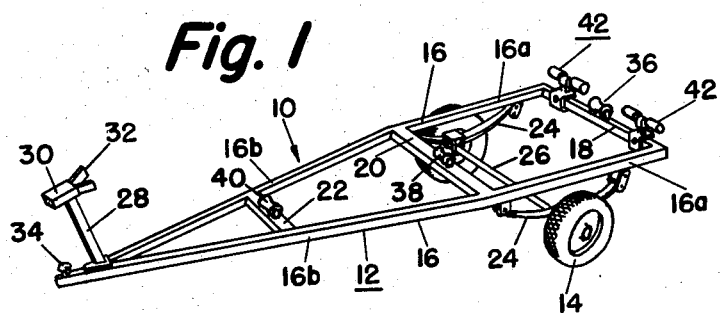
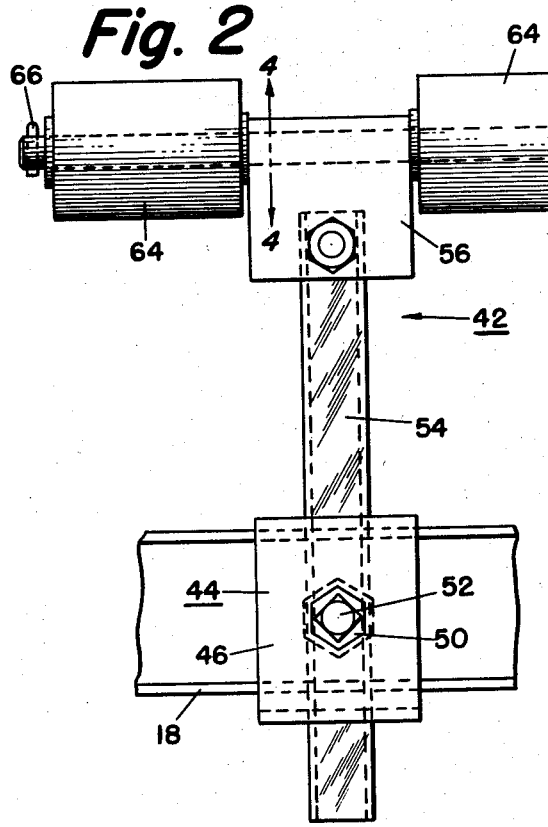
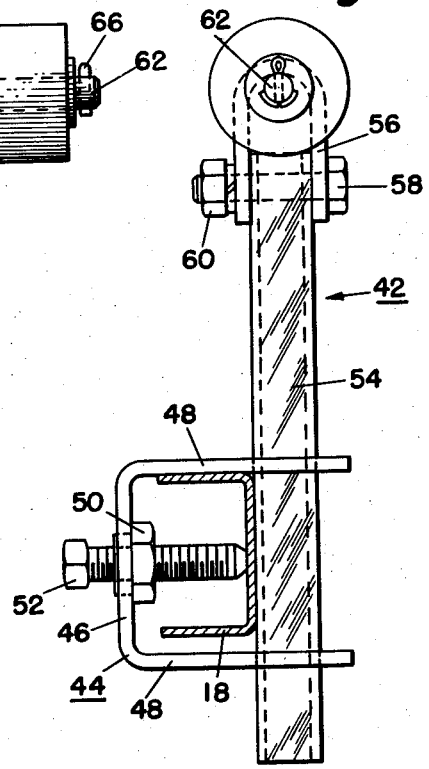
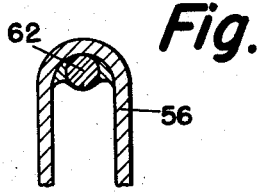
*INVENTOR.*
CARMEN J. CAPUANO
BY Arthur H. Seidel
ATTORNEY

2,948,423

BOAT TRAILER

Carmen Joseph Capuano, Philadelphia, Pa., assignor to Sealion Metal Fabricators, Philadelphia, Pa., a partnership Filed Mar. 16, 1959, Ser. No. 799,593

2 Claims. (Cl. 214—84)

The present invention relates to a boat trailer, and more particularly to a boat trailer having adjustable supports for supporting the hull of a boat.

In general, a boat trailer comprises a frame mounted on one or more sets of wheels. The frame has a series of longitudinally aligned supports for supporting the keel of the boat, and additional supports on opposite sides of at least one of the keel supports for engaging and supporting the hull of the boat to prevent the boat from tipping sideways. To permit the trailer to accommodate various sizes and shapes of boats, it is desirable that the hull supports be easily adjustable horizontally, vertically, and angularly so that the hull supports can be easily and quickly positioned to properly support the particular size and shape of boat to be carried on the trailer.

It is an object of the present invention to provide a novel boat trailer.

It is another object of the present invention to provide a boat trailer having adjustable hull supports so that the trailer can accommodate various sizes and shapes of boats.

It is a further object of the present invention to provide a hull support for a boat trailer which is easily and quickly adjustable horizontally, vertically, and angularly.

Other objects will appear hereinafter.

For the purpose of illustrating the invention there is shown in the drawings a form which is presently preferred; it being understood, however, that this invention is not limited to the precise arrangements and instrumentalities shown.

Figure 1 is a perspective view of the boat trailer of the present invention.

Figure 2 is a front elevational view of the hull support of the boat trailer of the present invention.

Figure 3 is a side elevational view of the hull support of the boat trailer of the present invention.

Figure 4 is a sectional view taken along line 4—4 of Figure 2.

Referring initially to Figure 1, the boat trailer of the present invention is generally designated as 10. Boat trailer 10 comprises a frame, generally designated as 12, mounted on wheels 14.

Frame 12 comprises a pair of metal side rails 16. The rear portions 16a of the side rails 16 are parallel to each other, and the front portions 16b of the side rails 16 are angled toward each other, and are connected together at their front ends. A metal rail 18 is connected between the rear ends of the side rails 16. Intermediate metal rails 20 and 22 are connected between the side rails 16 parallel to the rear rail 18 and at longitudinally spaced points along the side rails 16. The rear rail 18 and intermediate rails 20 and 22 are made of U-shaped channel beams, and are arranged with the arms of the channel beams extending horizontally. The side rails 16 may also be made of U-shaped channel beams.

A set of bowed leaf springs 24 extends longitudinally beneath the rear portion 16a of each of the side rails 16, and the ends of the leaf springs 24 are secured to the bottom of the side rails 16. An axle 26 extends between the leaf springs 24 and is supported adjacent its ends on the leaf springs 24. The wheels 14 are rotatably mounted on the ends of the axle 26.

A post 28 is mounted on the front end of the frame 12, and extends upwardly and forwardly from the frame 12. A bracket 30 is mounted on the top of the post 28. Bracket 30 has a pair of divergent arms 32 extending toward the rear of the frame 12. The arms 32 are adapted to receive the bow of a boat therebetween. A trailer hitch 34 is secured to the front end of the frame 12. A roller 36 is mounted on the top of the rear rail 18 of frame 12 intermediate the ends of the rear rail 18. Rollers 38 and 40 are mounted on the top of the intermediate rails 20 and 22 respectively in longitudinal alignment with the roller 36 on the rear rail 18 and the post 28. Each of the rollers 36, 38, and 40 has a concave outer surface, and the rollers 36, 38, and 40 are adapted to receive and support the keel of a boat. A pair of adjustable hull supports, generally designated as 42, are mounted on the rear rail 18 at opposite sides of the roller 36.

Referring to Figures 3 and 4, each of the adjustable hull supports 42 comprises a U-shaped clamp 44 having a flat base 46 and parallel arms 48. The base 46 of the clamp 44 has a central hole therethrough, and an internally threaded bushing 50 extends through the hole in the base 46 and is secured to the base 46. A headed clamping screw 52 is threaded through the bushing 50. The arms 48 of the clamp 44 have aligned square holes therethrough adjacent their outer ends. The clamp 44 extends around the rear rail 18 with the base 46 of the clamp 44 extending across the open side of the rear rail 18, and with one of the arms 48 of the clamp 44 seated on the top of the rear rail 18 (see Figure 3). The arms 48 of the clamp 44 project beyond the side of the rear rail 18 a distance so that the holes through the arms 48 are beyond the side of the rear rail 18. A square post 54 extends through the holes in the arms 48 of the clamp 44, and is perpendicular to the rear rail 18. A U-shaped clevis 56 fits over the upper end of the post 54 with the end portions of the arms of the clevis 56 overlapping the opposed sides of the post 54 which are parallel to the rear rail 18. A bolt 58 extends through aligned holes in the arms of the clevis 56 and the post 54. A nut 60 is threaded on the end of the bolt 58. Thus, the clevis 56 is pivotably mounted on the upper end of the post 54. A rod 62 extends through the clevis 56. Rod 62 is secured intermediate its ends to the inside of the base of the clevis 56, such as by welding or brazing (see Figure 4). A pair of rollers 64 are rotatably mounted on the rod 62 at opposite sides of the clevis 56. Cotter pins 66 extend through holes in the ends of the rod 62 to secure the rollers 64 on the rod 62.

The hull support 42 is tightly secured to the rear rail 18 of the frame 12 by threading the locking screw 52 inwardly until it engages the side of the rear rail 18. Further inward threading of the locking screw 52 moves the base 46 of the clamp 44 away from the rear rail 18, and thereby pulls the post 54 toward the rear rail 18. The inward threading of the locking screw 52 is continued until the post 54 is clamped tightly against the side of the rear rail 18. The post 54 is then clamped against vertical movement, and the clamp 44 is secured to the rear rail 18 against horizontal movement along the rear rail 18. To adjust the hull supoprt 42 to properly support a particular size or shape boat, the locking screw 52 is threaded outwardly away from the side of the rear rail 18. The post 54 is then free to be moved vertically, and the clamp 44 is free to be moved horizontally along the rear rail 18. When the proper horizontal and vertical position of the rollers 64 is obtained, the locking screw 52 is threaded inwardly until the post 54 is clamped tightly against the rear rail 18. The clevis 56 is then pivoted on the bolt 58 until the rod 62 is at the proper angle to permit both of the rollers 64 to engage and support the hull of the boat. Thus, the hull support 42 is easily and quickly adjusted to properly support the particular size and shape of the boat to be carried on the trailer 10. Although, the trailer 10 is shown as having the hull supports 42 only on the rear rail 18 of the frame 12, the hull supports 42 can also be provided on the intermediate rails 20 and 22 at opposite sides of the rollers 38 and 40.

The present invention may be embodied in other specific forms without departing from the spirit or essential attributes thereof and, accordingly, reference should be made to the appended claims, rather than to the foregoing specification as indicating the scope of the invention.

I claim:

1. A boat trailer comprising a frame mounted on wheels, said frame having a pair of side rails and a plurality of rails connecting said side rails at longitudinally spaced points along the side rails, means on said connecting rails for supporting the keel of a boat, and a pair of adjustable hull supports on at least one of said connecting rails on opposite sides of said keel supporting means, each of said hull supports comprising a U-shaped clamp fitting around said connecting rail with the base of the clamp extending vertically across one side of the connecting rail, and the arms of the clamp being planar and extending horizontally across the connecting rail and projecting beyond the other side of the connecting rail, a post extending through aligned holes in the arms of said clamp, said post being perpendicular to said connecting rail and extending vertically across the other side of the connecting rail, a locking screw threaded through the base of said clamp and engaging said connecting rail to clamp the post tightly against the connecting rail, a rod pivotably mounted on the top end of said post, and a pair of rollers rotatably mounted on said rod, each of the boat hull supports including a U-shaped clevis fitting over the upper end of the post with the ends of the arms of the clevis overlapping opposite sides of the post, a bolt extending through the arms of the clevis and the post, a nut threaded on the end of the bolt, said clevis being mounted freely pivotable on said bolt, the rod extending through the clevis and being secured intermediate its ends to the inside of the base of said clevis, and the rollers being mounted on said rod on opposite sides of said clevis.

2. A boat trailer in accordance with claim 1 in which the post of each of the boat hull supports is square in transverse cross-section, and the post extends through square holes in the arms of the clamp.

References Cited in the file of this patent

UNITED STATES PATENTS

| | | |
|---|---|---|
| 2,208,358 | Chandler | July 16, 1940 |
| 2,543,357 | Dotson | Feb. 27, 1951 |
| 2,788,146 | Gronlund | Apr. 9, 1957 |
| 2,816,672 | Facchini | Dec. 17, 1957 |
| 2,852,152 | Rosselle | Sept. 16, 1958 |

FOREIGN PATENTS

| | | |
|---|---|---|
| 578,513 | Germany | June 14, 1933 |